May 28, 1929.   C. B. WHITE   1,715,262
SALVAGING STORAGE BATTERY ELECTRODES
Filed Aug. 9, 1927
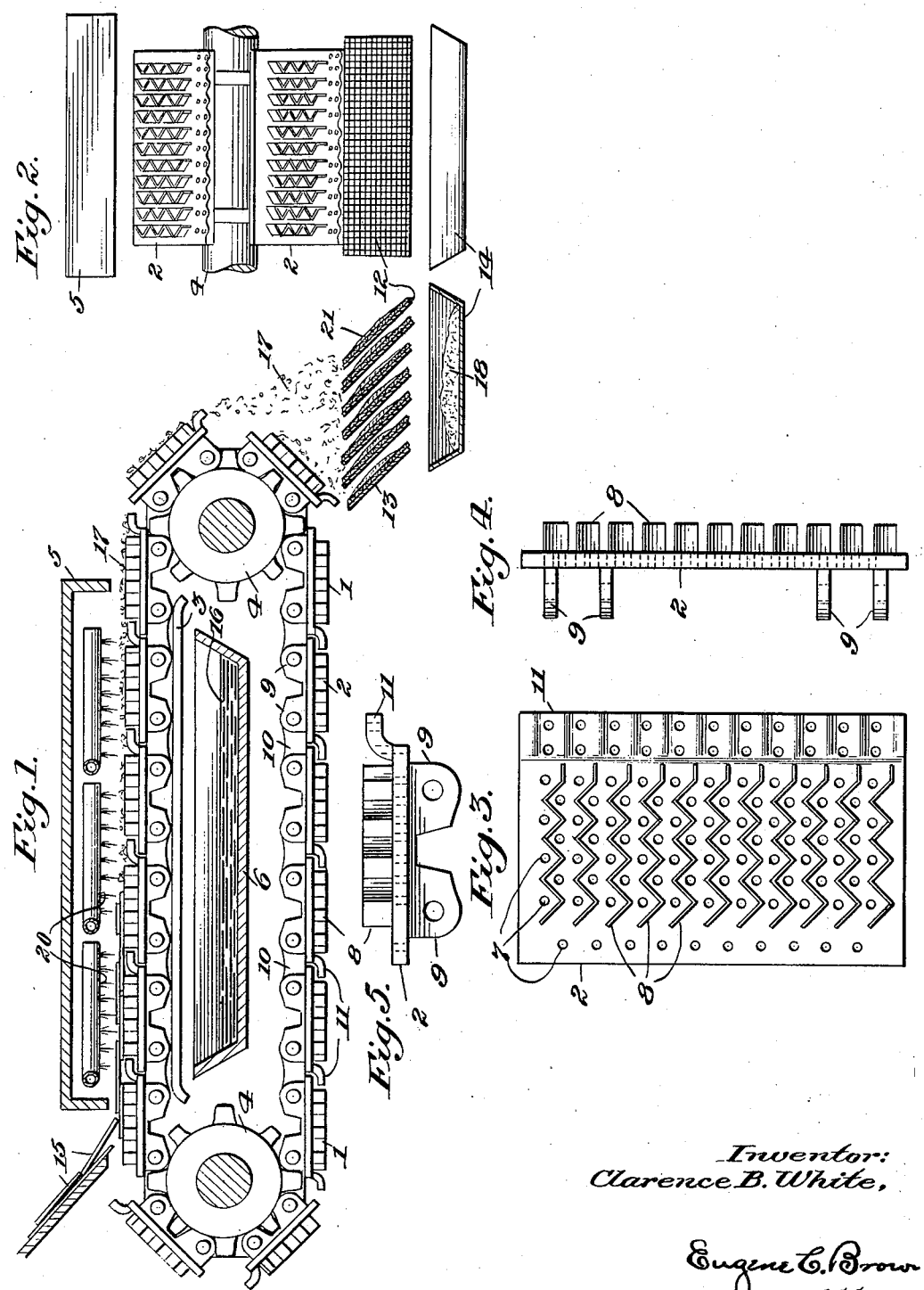
Inventor:
Clarence B. White,
Eugene C. Brown
Att'y.

Patented May 28, 1929.

1,715,262

UNITED STATES PATENT OFFICE.

CLARENCE B. WHITE, OF PHILADELPHIA, PENNSYLVANIA.

SALVAGING STORAGE-BATTERY ELECTRODES.

Application filed August 9, 1927. Serial No. 211,744.

This invention relates to a method of and apparatus for the salvaging of the useful material of worn out and exhausted or disintegrating storage battery electrodes and has for its objects the rapid and efficient recovery of the metallic parts of the electrodes including the lead of the connector lugs and the antimonial-lead grids, and also at the same time separating and collecting the less fusible active material.

A further object is to provide an apparatus by which the process can be practiced.

In the accompanying drawings,

Fig. 1 represents a vertical longitudinal section of the apparatus.

Fig. 2 is a view of the discharge end of the travelling hearth from the right of Fig. 1; and Figs. 3, 4 and 5 are enlarged plan, side, and end views of a perforated plate section constituting a part of the travelling hearth.

In Fig. 1, a conveyor or travelling hearth 1, made of a series of connected overlapping ribbed and perforated metal plates, 2, and suitably supported upon rails 3 and sprocket wheels 4, travels within a reverberatory or other type of furnace or oven 5; below the travelling hearth 1, between the sprocket wheels 4, is a receiver 6 of any suitable type to collect molten metal which runs through the perforations 7 in plates 2. At the discharge end of the travelling hearth 1, are a number of elements having roughened surfaces, for example inclined screens 12, made of heavy wire, but of fine mesh, preferably more than one layer of such screen to a section. The screens rest against and are supported by iron plates 13, but are made easily removable so that any one may be withdrawn and a new one quickly inserted. Below the screens is a suitable collecting pan 14 to receive material not retained by the screens 12.

The plates 2 of the hearth 1 are provided with a series of interlaced upstanding webs 8, which serve to support the charge of battery electrodes 15 above the perforations 7, allowing a free discharge for molten metal. The plates 2 have lower projecting lugs 9 which are perforated, and connected by links to the adjacent plates as shown. Upon one side of each plate 2 is a perforated and preferably corrugated flap 11, to cover the opening between the adjacent plates, the folds of the corrugations stiffening the flap 11 and otherwise supporting the charge above the perforations. The reverberatory furnace or oven 5 is suitably heated, either by coal, or oil, or gas, the flames 20 extending over the movable hearth and suitably heating the charge to melt the metal, but not sufficient to fuse the active material, consisting of lead oxide and lead sulphate.

The operation is as follows:

Discarded or exhausted storage battery electrodes 15, which are to be salvaged, are suitably delivered to the travelling hearth 1 at the left end, and are carried through the furnace 5, in which the exposed metal parts comprising the lugs and marginal rectangular frame composed of antimonial lead are melted, the molten metal flowing through the perforated plates 2 into the receptacle 6 where it collects, as indicated at 16, and may be removed continuously or as desired. The active material of the plates remains intact upon the hearth and carries the entrapped melted lead of the grid bars which were embedded within the active material. As the hearth plates reach the discharge end and tilt downwardly, the hot active material slides off, breaking apart and disintegrating as it reaches the edge of the plates and falls. Most of the entrapped molten lead of the grid bars escapes and descends separately along with the broken fragments of active material, while any portions that are still entrapped are set free by the impact with the screens. The molten lead adheres to the cooler roughened surface 12 of the screens as indicated at 21, while the disintegrated active material rolls or slides over the inclined screens and is collected below in a suitable receptacle 18. The active material, which is mainly lead oxide, has thus been completely separated and segregated from the antimonial lead of the grid and frame of the plate. When a sufficient amount of lead has adhered and solidified on the screens or roughened surfaces of the inclined lead-gathering members 13, they are removed and fresh ones are inserted. The antimonial lead which has adhered to the screens or members 13 may be readily removed by heating to a melting temperature, while pure lead may be recovered by reducing the lead oxide.

I have provided a method of mechanically separating and completely segregating the antimonial lead of the supporting grid and frame from the active material so that neither is contaminated with the other. The initial step in this method removes the larger portion of the antimonial lead, comprising the marginal frame and lugs so that only the smaller portion of the antimonial lead of the grid bars which are enveloped by the active material remains to be separated during the latter part of the process. In this manner I am enabled to collect all of the remaining lead on the screens while permitting the disintegrated active material to escape freely and pass on down between the screen members into the receptacle below; whereas if the whole amount of molten lead was discharged with the active material it would not be possible to separate one from the other, because the large amount of molten lead falling upon the screen would not adhere and also because a considerable amount of the active material would be entrapped by the large amount of falling metal. By first removing the larger amount of molten metal I have entirely obviated this difficulty.

I claim:

1. The method of salvaging old storage battery plates to separately recover the antimonial lead forming the grid frame and the filler material comprising lead oxide and lead sulphate, which consists in heating the plates to a temperature sufficient to liquefy only the metal portions, collecting the molten metal which flows therefrom in a receptacle, projecting the hot filler material and entrapped liquid metal upon a cooler body having a rough surface, thereby disintegrating the mass of filler material and liberating the entrapped molten metal, permitting it to adhere to said body, and collecting the separated filler material.

2. The steps in the method of salvaging storage battery plates to separately recover the antimonial lead forming and the filler material of lead oxide and lead sulphate, which consists in heating the plates to a temperature sufficient to liquefy the metal portions, and delivering the hot filler material upon a roughened surface to thereby disintegrate the mass of filler material and liberate the molten metal entrapped therein, thereby permitting the metal to adhere to the roughened surface.

3. Apparatus for salvaging old storage battery plates wherein the filler of lead oxide and lead sulphate is carried by a frame and grid of lead, which comprises a traveling hearth having perforated plates to receive and convey the plates, means to heat the plates thereon, means to collect the molten lead below said hearth, means having a roughened surface to receive the mass of filler material and entrapped molten grid metal as it falls from the discharge end of the traveling hearth, said filler material being disintegrated as it walls upon said roughened surface thereby liberating the entrapped molten lead which thereupon adheres to said surface.

4. In an apparatus, as set forth in claim 3, said plates being provided with ridges to support the plates while permitting the melted metal to drop down through the perforations in the hearth.

5. An apparatus for salvaging old storage battery plates or electrodes to separate and recover the metal portions from the less fusible active filler material, comprising a traveling hearth provided with perforated supporting members adapted to receive the plates, means for applying sufficient heat thereto to melt the metal of the plates, a separating element having a roughened surface located below the discharge end of the hearth and adapted to receive the impact of the solid less fusible filler-material of the electrodes with the retained molten metal, said roughened separating element serving to entrap and retain the molten metal, while permitting the solid material to pass thereover.

6. In an apparatus for salvaging old storage battery plates or electrodes to recover and separate the metal portions from the less fusible active material, an inclined cellular separating and retaining element adapted to receive the heated active material and molten metal dropped thereon, said cellular element functioning to retain the liquid metal ejected from the heated mass by the impact while permitting the solid material to pass beyond said element.

In testimony whereof I affix my signature.

CLARENCE B. WHITE.